Patented Nov. 29, 1927.

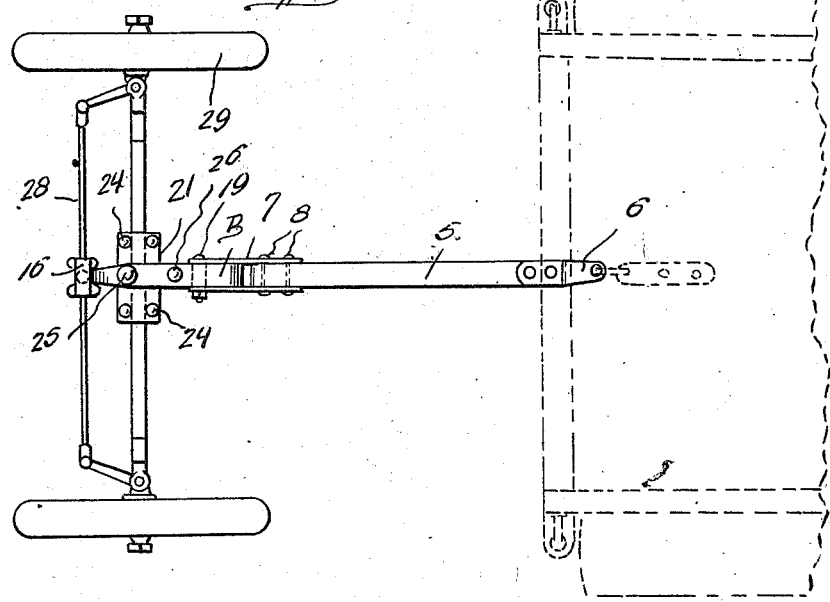
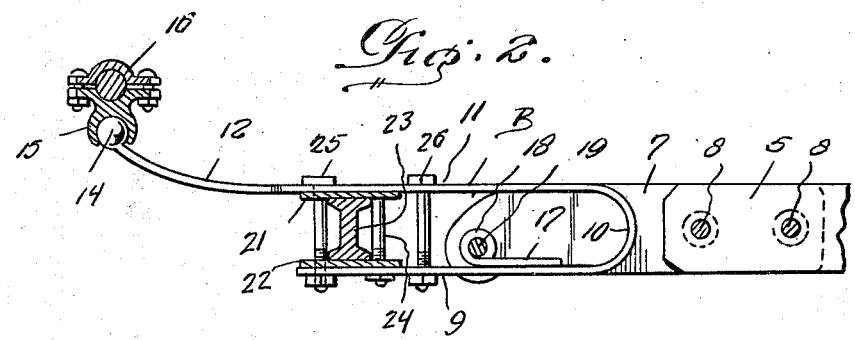
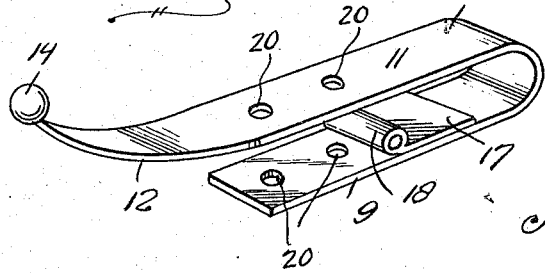

1,650,599

UNITED STATES PATENT OFFICE.

JAMES M. BROWN, OF SEYMOUR, TEXAS.

TOWING DEVICE.

Application filed December 14, 1926. Serial No. 154,745.

The present invention relates to a towing device for use with automobile trailers and it contemplates the provision of a device of this nature which will properly steer the trailer to follow the towing machine.

Another very important object of the invention lies in the provision of a device of this nature which will prove strong and durable and will take care of the roughness in the road and the different levels of the towed vehicle and the towing vehicle.

Another very important object of the invention lies in the provision of a device of this nature which may be readily attached to the trailer and is of simple construction so that it may be manufactured at a low cost.

Another very important object of the invention lies in the provision of a device of this nature which is thoroughly reliable and efficient in use and otherwise well adapted to the purpose for which it is designed.

With the above and numerous other objects in view as will appear as the description proceeds, the invention resides in certain novel features of construction, and in the combination and arrangement of parts as will be hereinafter more fully described and claimed.

In the drawings:

Figure 1 is a top plan view of the device embodying the features of my invention showing the same attached to the front wheel assembly of a trailer, Fig. 2 is a fragmentary sectional elevation of the rear end thereof, Fig. 3 is a detail perspective view of the bracket portion of the device.

Referring to the drawing in detail it will be seen that 5 denotes the tongue which has a bracket 6 at the forward end thereof provided with an eye for attachment to the towing vehicle in any suitable or preferred manner.

A pair of arms 7 are attached to the rear end of the tongue 5 by bolts 8 or in any other preferred manner to project rearwardly thereof. The letter B denotes generally the rear end bracket which is of a substantial U-shaped formation to include a bottom plate portion 9, a bight 10, a top plate portion 11 which merges into an extension at its end as at 12, said extension 12 curving upwardly and tapering towards its end and terminating in a ball 14. A socket 15 receives the ball 14 and has a clamped structure 16 associated therewith. A plate 17 is welded or otherwise secured to the intermediate portion of the bottom plate 9 on the upper surface thereof and the rear end of the plate 17 terminates in a sleeve 18 the axis of which extends transversely. A pin 19 extends through the sleeve 18 and through openings in the rear ends of the arms 7 thus pivoting the rear bracket B between the arms 7 and to the rear end of the tongue 5. The plates 9 and 11 are provided each with a pair of apertures which register. Plates 21 and 22 are disposed above and below the axle 23 of the trailer. Bolts 24 hold the plates 21 and 22 in place while a bolt 25 pierces the rear openings 20 and registering openings in the plates 21 and 22 for pivoting the bracket B on these plates 21 and 22. A bolt 26 extends through the other aperture 20 and limits the swinging movement of the bracket in relation to the plates as it will be seen that this bolt will abut the plates 21 and 22 when the tongue is swung too far in either direction.

It is manifest from the above that as the towing vehicle turns the tongue is swung therewith thereby swinging the bracket B and causing the proper movement of the connecting rod 28 engaged in the clamp 16 for steering the front wheels 29 of the trailer.

It is thought that the construction, operation, and advantages of this invention will now be apparent to those skilled in this art without a more detailed description thereof. The present embodiment of the invention has been disclosed in detail, merely by way of example, since in actual practice it attains the features of advantage enumerated as desirable in the statement of the invention and the above description. It will be apparent that changes in the details of construction, and in the combination and arrangement of parts may be resorted to without departing from the spirit or scope of the invention as hereinafter claimed or sacrificing any of its advantages.

Having thus described my invention, what I claim as new is:

A device of the class described including, in combination, a tongue, a pair of arms fixed to the rear end of the tongue and projecting rearwardly therebeyond in spaced parallelism, a bracket formed from a strip of metal bent over upon itself into a substantial U-shaped formation to provide a bottom plate, a bight and a top plate, a plate secured to the intermediate portion of the bottom plate and terminating in a sleeve, a pin extending through the sleeve and the rear extremities of the arms, the rear extremity of the top plate being extended and curved rearwardly and upwardly, means on the extremity of the top plate to engage steering knuckle connecting rod, means for pivotally mounting the bracket on an axle, and a bolt between the top and bottom plates of the bracket.

In testimony whereof I affix my signature.

JAMES M. BROWN.